United States Patent [19]

Daxer et al.

[11] Patent Number: 5,560,334
[45] Date of Patent: Oct. 1, 1996

[54] PISTON WITH A REINFORCING INSERT

[75] Inventors: Georg Daxer; José Leites, both of São Paulo, Brazil

[73] Assignee: Metal Leve S.A. Indústria E. Comércio, São Paulo, Brazil

[21] Appl. No.: 495,647

[22] PCT Filed: Oct. 29, 1993

[86] PCT No.: PCT/BR93/00041

§ 371 Date: Jun. 23, 1995

§ 102(e) Date: Jun. 23, 1995

[87] PCT Pub. No.: WO94/15088

PCT Pub. Date: Jul. 7, 1995

[30] Foreign Application Priority Data

Dec. 23, 1992 [BR] Brazil ......................... 9204730

[51] Int. Cl.$^6$ ................. F02B 23/06; F02F 3/26; F02F 3/04
[52] U.S. Cl. ............... 123/279; 92/213; 123/193.6
[58] Field of Search .................. 123/276, 279, 123/193.6; 92/212, 213

[56] References Cited

U.S. PATENT DOCUMENTS

| 2,473,254 | 6/1949 | Morris | 92/213 |
| 3,596,571 | 8/1971 | Hill et al. | 123/193.6 X |
| 4,742,759 | 5/1988 | Hayakawa | 92/213 X |
| 5,013,610 | 5/1991 | Suzuki | 428/545 |

FOREIGN PATENT DOCUMENTS

| 3328435 | 8/1983 | Germany . | |
| 62-10457 | 1/1987 | Japan | 123/193.6 |
| 63-255550 | 10/1988 | Japan | 123/193.6 |

OTHER PUBLICATIONS

Patent Abstracts of Japan, vol. 8, No. 227 (M–332) (1664), Oct. 18, 1984, abstract of JP–A–59–108849.
Patent Abstracts of Japan, vol. 10, No. 62 (M–460) (2119), Mar. 12, 1986, abstract of JP–A–60–206958.

Primary Examiner—Tony M. Argenbright
Attorney, Agent, or Firm—Darby & Darby, P.C.

[57] ABSTRACT

Piston with a reinforcing insert, presenting a top face (11) with a recessed combustion chamber (12) provided with a lateral peripheral wall, defined by the annular insert (20), which presents an internal end face (24) with a radial extension ($d_1$) that is substantially smaller than the radial extension ($d_2$) of the opposite external end face (22) of the annular insert (20). The radial thickness of the insert (20) varies along the profile of its external peripheral face (23), in order to maintain a value necessary to meet the requirements of structural reinforcement of the piston (10), at the region where the insert (20) is applied.

6 Claims, 1 Drawing Sheet

PISTON WITH A REINFORCING INSERT

FIELD OF THE INVENTION

The present invention refers, in general, to a new construction for pistons used in internal combustion engines and, more particularly, to a new construction for that type of pistons incorporating a reinforcing insert, usually called composite, in order to increase the strength of the piston at those portions that are submitted to higher stresses.

BACKGROUND OF THE INVENTION

The high thermo-mechanical stress to which the piston of more advanced engines are submitted led to the need of incorporating local reinforcements, in order to maintain the structural integrity of the aluminum pistons.

Particularly at the region defined by the combustion chamber edge, where the highest temperatures and thermo-mechanical stresses take place, in order to increase the local strength of the aluminum alloy of said pistons, it is common to incorporate porous ceramic inserts that are infiltrated by the aluminum base alloy. As a result from the manufacturing process used for obtaining said insert, usually the squeeze casting process for aluminum alloys, a composite of high structural strength is produced.

Due to the characteristics of the reinforcing material, the thermal expansion of the composite material is inferior to that of the base material of the piston (aluminum alloy).

In case the insert presents the usual annular shape defining the peripheral wall of the piston combustion chamber, a serious problem occurs at the interface between the low expansion material of the insert and the piston remaining material made of aluminum alloy of higher expansion. Due to the difference between the thermal expansion coefficients of both materials, there occur stresses, resulting from the difference between the expansion of both materials under the same temperature.

Since the insert is in the form of a ring, which presents a generally rectangular cross section, which is disposed around the piston combustion chamber and which is projected practically throughout the whole height of the latter, from the upper end face of said piston, the interface defined between the lower end face of the insert and the adjacent radial face of the piston material made of aluminum alloy is disposed at a region submitted to high temperatures, as said region is close to the bottom of the piston combustion chamber.

The high temperatures at the piston region defined along the radial extension of said lower interface of the insert tend to force the piston aluminum alloy to expand radially, at values different from those of the corresponding radial thermal expansion of the insert material, thus demostrating the occurrance of the stresses mentioned above, which reach values sufficient to cause cracks and even ruptures on the piston aluminum alloy.

DISCLOSURE OF THE INVENTION

The present invention has the objective of providing a new construction for a piston of this type, which avoids or at least minimizes the occurrance of the above cited stresses, without affecting the structural integrity of the piston.

The piston object of the present invention is generally cast in aluminum alloy, presenting a top face provided with a recessed combustion chamber, which has a peripheral lateral wall defined by the annular insert. According to the invention, the annular insert presents an internal end face with a radial extension that is substantially smaller than the radial extension of an opposite external end face of the annular insert, the radial thickness of the annular insert varying along the profile of the external peripheral face, in order to maintain a value required for the structural reinforcement of the piston at the region where the insert is applied.

With the constructive arrangement cited above, the insert may present a portion of its extension, adjacent the external end face, with a larger thickness, which is necessary for achieving the desired structural reinforcement of the piston at this end face region, which surrounds the combustion chamber and which is subjected to high thermal and mechanical efforts, and also to high temperatures. As there is not a radial interface between the insert and the remaining portion of the piston at said external end portion of the insert, the value of the thickness of the latter will not cause relevant stresses to the piston, resulting from the difference of thermal expansion of both materials at the same temperature.

It should also be observed that the axial interface region, disposed between the insert and the piston aluminum alloy and close to the top face of the latter, is subjected to much lower temperatures than those of the radial interface region adjacent the bottom of the combustion chamber. Nevertheless, at the radial interface region, the piston is submitted to mechanical efforts, which are not as high as those existing at the external end portion of the insert, thereby not requiring to present the same thickness as the external end portion.

The reduction of the radial thickness of the insert, according to the requirements of the structural reinforcement of the piston, allows achieving a radial interface of reduced length, thereby practically avoiding the occurrance of thermal stresses originated from the difference between the thermal expansion coefficients of the composite and the remaining material of the piston, which are relevant and prejudicial to the structure of the piston at that region.

BRIEF DESCRIPTION OF THE DRAWINGS

The invention will be described below, with reference to the attached drawings, in which.

BEST MODE OF CARRYING OUT THE INVENTION

Figure 1:
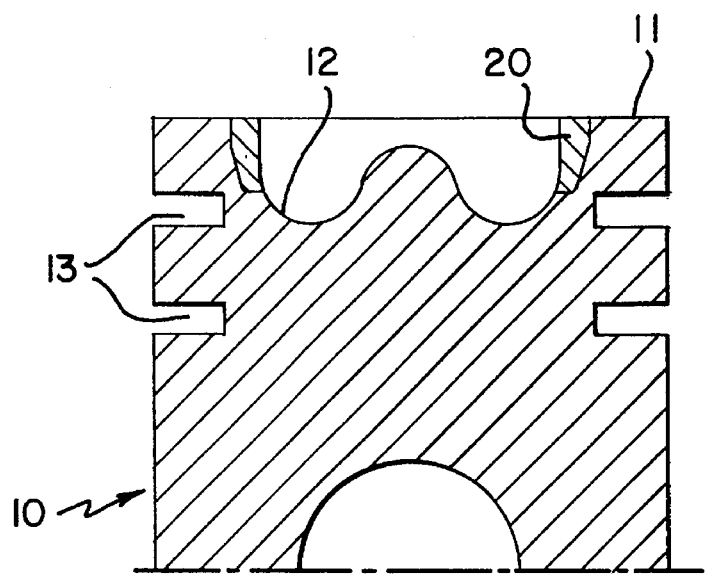
FIG. 1 is an axial sectional view of the upper portion of a piston, including a reinforcing insert according to the present invention.
Figure 2:
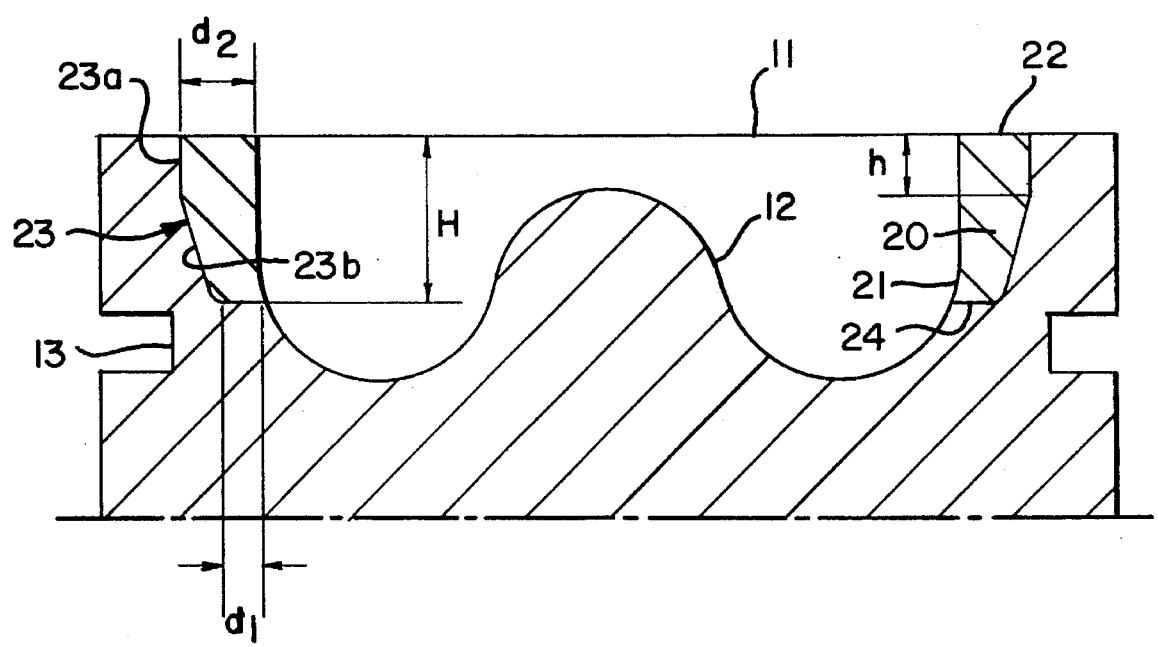
FIG. 2 shows an enlarged detail of FIG. 1, for a better visualization of the new construction.

According to the figures cited above, the piston 10, which is usually made of aluminum base alloy, presents its top face 11 provided with a recessed combustion chamber 12, and its peripheral face provided with grooves 13 for piston rings.

The lateral peripheral wall of the combustion chamber 12 is defined by an insert 20, which presents a height or axial extension "H", made of alumina fibers, for example, presenting the form of a ring, with the internal peripheral face 21 coinciding with and defining the lateral peripheral wall of the combustion chamber 12, whereas its external end face 22 of radial extension $d_2$ coincides with and defines the piston top face portion 11, which surrounds the edge of the combustion chamber 12.

The external peripheral face 23 of the insert 20 is defined by a cylindrical portion 23a, with the height "h" and adjacent the external end face 22, and by an inverted frusto-conical portion 23b, whose larger and smaller faces match, respectively, through curvature radii, with the cylindrical portion 23a and an internal end face 24 of radial extension $d_1$, facing the bottom of the combustion chamber 12.

As observed in the figures, the radial extension of the internal end wall 24 of the insert 20 is substantially smaller than the radial extension of the external end wall 22. This arrangement of reducing the radial thickness of the insert 20 at its internal end portion allows eliminating the problem of undesirable stresses occurring at that region of the piston, as a function of the difference between the coefficients of thermal expansion of the aluminum alloy and the insert.

It should be observed that, with said constructive arrangement, the internal end face 24 of the insert 20 defines an extension of radial interface with the base alloy of the piston, said extension being much reduced at a region submitted to the high temperatures of the combustion chamber and to the mechanical efforts, which are substantially lower than those to which is submitted the piston region adjacent the top face 11. The reduction of the radial thickness of the insert 20 may be made with different profiles for its external peripheral face 23, the illustrated face being only a preferred form, in which the following approximate dimensional relations are obeyed:

H=(0.09–0.150)×piston diameter
h=(0.03–0.05)×piston diameter
$d_1$=$d_2$×(0.30–0.50)
$d_2$=(0.04–0.12)×piston diameter The incorporation of the insert 20 may be obtained through any process, such as squeeze casting the aluminum alloy onto the insert.

After the incorporation of the insert to the base alloy, the composite material is machined to the piston final form, as illustrated in the figures.

We claim:

1. Piston with a reinforcing insert, said piston presenting a top face (11) with a recessed combustion chamber (12), whose lateral peripheral wall is defined by an annular insert (20), which has an internal peripheral face (21), an external peripheral face (23), and an internal end face (24) with a radial extension ($d_1$) substantially smaller than the radial extension ($d_2$) of an opposite external end face (22), adjacent to and defining part of the piston top face (11), characterized in that the external peripheral face (23) of the insert (20) is defined by a first portion (23a) adjacent to the external end face (22) and mantaining the radial thickness of the insert at a value, necessary to meet the requirements of the structural reinforcement of the piston (10) throughout the axial extension of its region where said first portion (23a) is positioned, and by a second inverted frusto-conical portion (23b), whose smaller base defines the internal end face (24) of the annular insert (20).

2. Piston, according to claim 1, characterized in that the first portion (23a) of the external peripheral face (23) of the annular insert (20) is cylindrical.

3. Piston, according to claim 1, characterized in that the axial extension (h) of the first portion (23a) of the external peripheral face (23) of the insert (20) is from 3 to 5% the diameter of the piston (10).

4. A piston according to claim 1, wherein the radial extension of the internal end face of the insert presents a value of from 30 to 50% of the value of the radial extension of its external end face.

5. Piston, according to claim 4, characterized in that the external end face (22) of the insert (20) presents a value from 4 to 12% the diameter of the piston (10).

6. A piston according to claim 1, wherein the axial extension of the insert corresponds to from 9 to 15% of the diameter of the piston.

* * * * *

UNITED STATES PATENT AND TRADEMARK OFFICE
CERTIFICATE OF CORRECTION

PATENT NO. : 5,560,334
DATED : October 1, 1996
INVENTOR(S) : Georg Daxer, et. al.

It is certified that error appears in the above-indentified patent and that said Letters Patent is hereby corrected as shown below:

Title page, item [75], inventor: should read--Jose M. M.Leites--.

Title page, item [30], delete "9204730" and insert therefor--PI 9204730 --.

Signed and Sealed this

Seventeenth Day of December, 1996

Attest:

BRUCE LEHMAN

Attesting Officer     Commissioner of Patents and Trademarks